(12) United States Patent
Kim et al.

(10) Patent No.: US 6,473,415 B1
(45) Date of Patent: Oct. 29, 2002

(54) INTERFERENCE CANCELING METHOD AND APPARATUS OF A MULTI-MODE SUBTRACTION TYPE IN ASYNCHRONOUS MULTIPATH CHANNELS OF CODE DIVISION MULTIPLE ACCESS SYSTEM

(75) Inventors: Seong Rag Kim; Jeong Goo Lee; Nam Jin Park; Hun Lee, all of Daejon (KR)

(73) Assignee: Electronics and Telecommunications Research Institute, Daejon (KR)

(*) Notice: Subject to any disclaimer, the term of this patent is extended or adjusted under 35 U.S.C. 154(b) by 0 days.

(21) Appl. No.: 09/145,240

(22) Filed: Sep. 1, 1998

(30) Foreign Application Priority Data

Dec. 26, 1997 (KR) ............................................. 97-74747

(51) Int. Cl.⁷ .............................................. H04B 15/00
(52) U.S. Cl. ......................... 370/342; 375/148; 375/346
(58) Field of Search ................................. 370/252, 335, 370/342; 375/346, 348, 349, 148; 455/63, 65, 67.3

(56) References Cited

U.S. PATENT DOCUMENTS

| | | | |
|---|---|---|---|
| 5,463,660 A | 10/1995 | Fukasawa et al. ........... 375/205 |
| 5,506,861 A | 4/1996 | Bottomley ................. 375/200 |
| 5,550,809 A | 8/1996 | Bottomley et al. ............ 370/18 |
| 5,550,810 A | 8/1996 | Monogioudis et al. ......... 370/18 |
| 5,553,062 A | 9/1996 | Schilling et al. .............. 370/18 |
| 5,568,473 A | 10/1996 | Hemmati ...................... 370/18 |
| 5,740,208 A | * 4/1998 | Hulbert et al. ............... 375/346 |
| 5,953,369 A | * 9/1999 | Suzuki ......................... 375/206 |
| 6,067,333 A | * 5/2000 | Kim et al. .................... 375/346 |

OTHER PUBLICATIONS

Seong Rag Kim et al., "Interference cancellation scheme with simple structure and better performance", Electronics Letters, Nov. 7, 1996, vol. 32, No. 23, pp. 2215–2217.

Pulin Patel et al., "Analysis of a Simple Successive Interference Cancellation Scheme in a DS/CDMA System", IEEE Journal of Selected Areas in Communications, vol. 12, No. 5, Jun. 1994, pp. 796–807.

Mahesh K. Varanasi et al., "Multistage Detection in Asynchronous Code–Division Multiple–Access Communications", IEEE Transactions on Communications, vol. 38, No. 4, Apr. 1990, pp. 509–519.

* cited by examiner

Primary Examiner—Steven Nguyen
Assistant Examiner—Duc Duong
(74) Attorney, Agent, or Firm—Jacobson Holman PLLC (57) ABSTRACT

The present invention provides an interference canceling method and the apparatus of a multi-mode subtraction type in asynchronous multipath channels of CDMA system, which cancel the interference based on the received signal power of each user (or path), which make the selected fingers keep participating in the subsequent cancellation processing with new (more cleaned) input signal, which do a scale factor's processing and a clipper's processing to make the tentative bit decision, which can select the proper interference canceling method among various interference canceling method according to the total number of users in service, the hardware speed to implement the present method and the power spread of received signals, which repeat the selected interference canceling process recursively with a stage of hardware, which can reduce the number of stage compared with parallel interference cancellation method of the prior art in case that the interference canceling apparatus is made up multi-stages, which do overlappingly a canceling process of the last bit of the multiple bits for efficient operation in the asynchronous channel, which reduce the interference according to the power sequence of each multipath signal instead of the power sequence of each user signal made up multipath signals for efficient operation in multipath channels with unequal powers, which can increase the performance and capacity of the CDMA system by reducing the interference produced by a multiple access process in CDMA system with the asynchronous multipath channels.

10 Claims, 7 Drawing Sheets

INTERFERENCE CANCELING METHOD AND APPARATUS OF A MULTI-MODE SUBTRACTION TYPE IN ASYNCHRONOUS MULTIPATH CHANNELS OF CODE DIVISION MULTIPLE ACCESS SYSTEM

BACKGROUND OF THE INVENTION

1. Field of the Invention

The present invention relates to an interference canceling method and apparatus of a multi-mode subtraction type in asynchronous multipath channels of code division multiple access (CDMA) system, and more particularly to the interference canceling method and apparatus of a multi-mode subtraction type to increase the performance and capacity of the CDMA system by reducing the interference produced by a multiple access process in CDMA system with the asynchronous multipath channels.

2. Description of the Related Art

The performance of CDMA systems is limited dominantly by interference, which results from the other users' signal involved in the system. These limitations are not inherent to CDMA, but result from using the conventional single-user detector. The CDMA system using the conventional single-user detector is not optimal in the presence of the multiple access interference (MAI) and the performance degradation ultimately results in system capacity reduction. Furthermore, the received signal powers at a base station may not be equal due to the user location or channel variation and, thus, strict power control should be employed with a single-user receiver.

There have been great efforts to mitigate the MAI and increase the capacity of CDMA system through multi-user detectors. Optimal multi-user detector shows excellent performance, but it is too complex to be implemented. To reduce the implementation complexity, therefore, most of the research has focused on finding suboptimal multi-user detectors. Especially, to suppress the MAI of reverse links in a base station, subtractive interference cancellation (IC) techniques such as the serial (successive) interference cancellation (SIC) method and the multistage parallel interference cancellation (PIC) method have been introduced. The prior art of the SIC method has been described by, for example, "Analysis of a Simple Successive Interference Cancellation Scheme in a DS/CDMA System", by P. Patel and J. Holtzman, IEEE J. on Selected Areas in Communications, Vol. 12, No. 5, pp.796–807, June 1994. The prior art of the PIC method has been described by, for example, "A Spread-Spectrum Multi-Access System with a Cascade of Co-channel Interference Cancellers for Multipath Fading Channels", by Y. C. Yoon, R. Kohno, and H. Imai, IEEE Second International Symposium on Spread Spectrum Techniques and Applications (ISSSTA'92), pp.87–90, Nov. 29–Dec. 2, 1992.

The basic concept of subtractive IC is that a user signal can be regenerated deterministically at receiver, and by canceling the regenerated signal from the original received signal so that the receivers of the remaining users can detect the transmitted data with a modified (interference canceled) receive signal.

The SIC method provides a simple successive solution by canceling a user's interference in order of received power at a successive cancellation. The first problem in the SIC method is that the detectors once selected make no more contribution again for subsequent operation. Consider a detector with the strongest power. This detector is selected first, and the corresponding user's signal is regenerated with the corrupted knowledge of the decision variable and channel parameters obtained from the received signal containing considerable amount MAI. Thus, the noise resulting from this imperfect regeneration affects the subsequent cancellation operation. The second problem can be introduced from practical implementation perspective. The SIC method requires a high speed hardware in order to process the total number of users in service within a bit interval. If a sufficiently high speed hardware is not available, an alternative is to limit the number of cancellations at the expense of performance degradation.

In the multistage PIC method, a form of parallel cancellation, at each user's detector input all the other users' signals are canceled every stage instead of successive cancellation. That is, for regenerating the other user's signal the estimates at a current stage are obtained based on the values at the previous stage, and this operation may be repeated for an arbitrary number of stages. The limit on the performance of PIC results from canceling the interference caused by all the other users without considering the reliability of each user signal. When the powers of the received signals are widely spread, as in the case of multipath fading channels, the performance of the PIC is inferior to that of the SIC since the detectors for the weak users participate in the cancellation with the corrupted estimates including channel parameters and bit decision. In addition, although the multistage PIC method does not require a high speed hardware, it require a multistage (cascade) of the same hardware set, which increases hardware complexity.

SUMMARY OF THE INVENTION

Accordingly, for overcoming the problems, it is an object of the present invention to provide the interference canceling method and the apparatus of a multimode subtraction type in asynchronous multipath channels of CDMA system which can increase the performance and capacity of the CDMA system by reducing the interference produced by a multiple access process in CDMA system with the asynchronous multipath channels.

The performance of subtractive ICs depends mainly on the accuracy of the information for regenerating MAI, such as the bit decision and the estimates of the channel parameters. However this is not guaranteed in low signal to noise and interference ratio (SNIR) situations. In practical mobile communication environments such as multipath fading channels, the reliability of interference estimate of each user (or path) is unequal and time-varying. The reliability of interference estimate of a user (or a path) with high power is obviously higher than that with low power. In the present invention, the detectors with low SNIR input signals do not participate in earlier cancellations. This is, the detectors not involved in earlier cancellations are to be included in later cancellations when sufficient SINR is guaranteed after canceling the signals with high power in earlier cancellations.

In the present invention, the bit decision and the estimates of the channel parameters for all detectors are updated with new (more cleaned and enhanced) input to detectors at every cancellation. In the present invention, unlike the SIC method, the selected detectors keep participating in cancellation processing with new updated estimates and update their bit decisions based on the input after the current cancellation at every step while the selected detector performs the ordinary cancellation as in the SIC method. It is important to note that this operation adds no processing time in a cancellation that restricts the number of iteration.

Unlike the PIC method, the present invention prevents the detectors whose input signals are too week to improve the cancellation performance from participating in cancellation by the ranking of each user-received signal power. This is, the present invention cancels the MAI with considering the reliability of each user signal based on the received signal power. In the present invention, the detectors selected at the previous cancellations as well as the detectors selected at the current cancellation only participate in the cancellation. As the number of cancellation increases, the number of detectors having been selected up to the current cancellation increases.

The present invention supports the multi-mode IC method. The present invention can select the proper IC method by considering the total number of users in service, the hardware speed to implement the present method and the power spread of received signals. Also, the present invention repeats the selected IC process recursively with a stage of hardware, which can reduce the hardware complexity required for the multistage PIC method.

In most realistic applications, the reverse links, for which the subtractive IC methods are implemented, are chip-asynchronous and usually have several paths.

For efficient operation in the asynchronous channel, the interference canceling method of processing overlappingly the last bit of the multiple bits, instead of the method of the interference canceling in terms of the multiple bits only in the asynchronous channel, is used. By using this interference canceling method, the other delayed users can have the entire benefit from cancellation of the leading users in the asynchronous channel.

For efficient operation in multipath channels with unequal powers, at each cancellation a group of fingers with maximum power except for the fingers selected at previous cancellation is selected. That is, a group of fingers from different user detectors can be selected while a user detector composed of a group of fingers is selected in the SIC method. In practice, the relative power of minor paths to a dominant path is very weak; thus the SIC method selecting a user detector shows performance degradation since the finger(s) for weak path(s) is (are) involved in cancellation with poor estimates. In the present invention, the finger with the minor path will be selected later than the finger with the dominant path.

BRIEF DESCRIPTION OF THE DRAWINGS

For fuller understanding of the nature and object of the invention, reference should be had to the following detailed description taken in conjunction with the accompanying drawings in which.

DETAILED DESCRIPTION OF THE INVENTION

The present invention will be explained below in detail with reference to the accompanied drawings.

Figure 1:
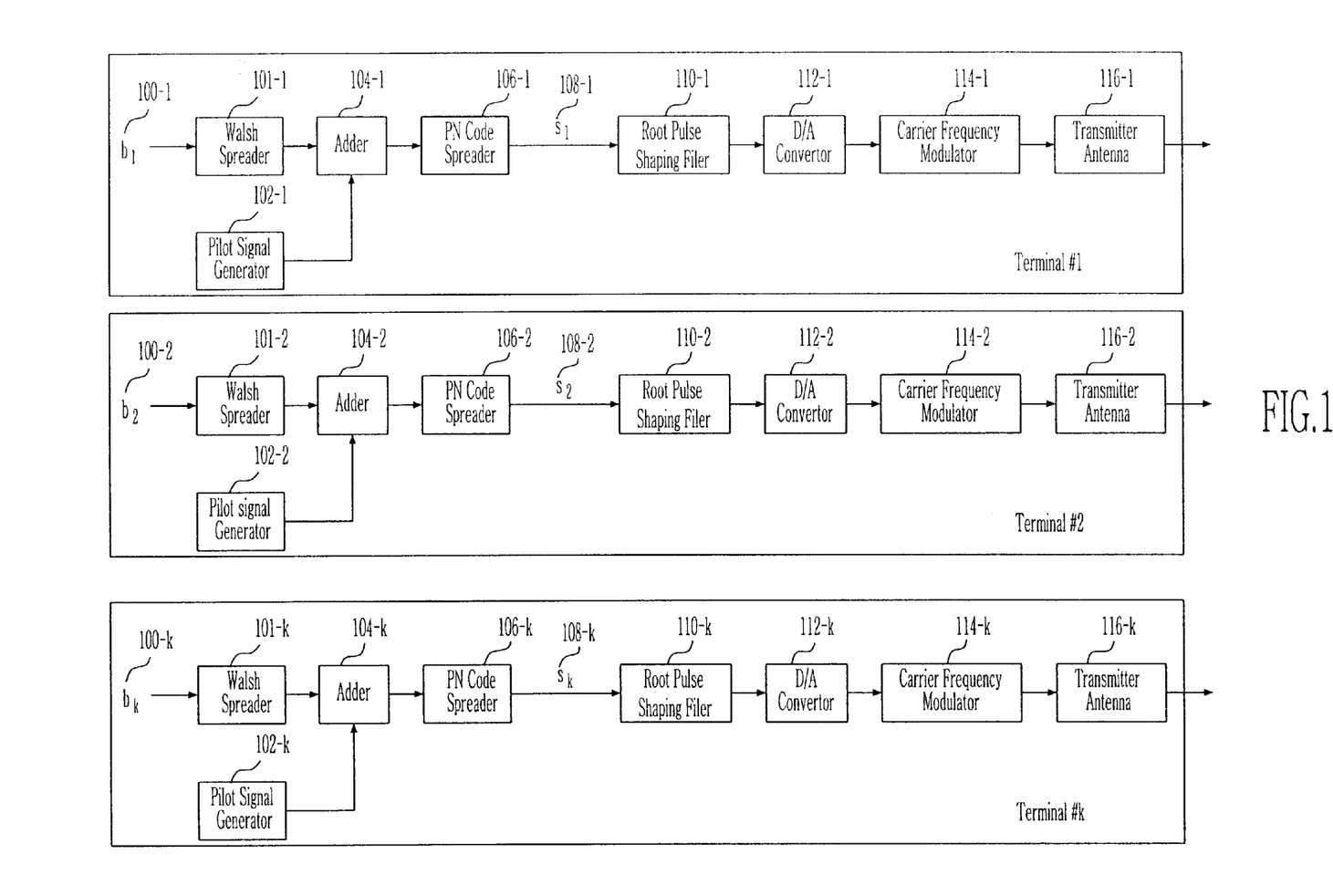
FIG. 1 is a structure diagram of a terminal of each user.

FIG. 1 is a structure diagram of a terminal of each user in a wireless mobile communication of CDMA method.

The information bit signals 100-1, 100-2, 100-K which each user may transmit in the terminals (Terminal #1, Terminal #2, . . . , Terminal #K) of each user, which are spread in walsh spreaders 101-1, 101-2, 101-K, and added to a pilot signal generated in pilot signal generators 102-1, 102-2, 102-K in adders 104-1, 104-2, 104-K and spread in pseudo-random noise (PN) code spreaders 106-1, 106-2, 106-K, are then transformed into the baseband signals 108-1, 108-2, 108-K of each user. The baseband signals of each user, which are passed through root pulse shaping filters 110-1, 110-2, 110-K and D/A (Digital-to-Analog) converters 112-1, 112-2, 112-K and modulated in carrier frequency modulators, are transmitted through antennas 116-1, 116-2, 116-K. The walsh spreaders are to discriminate exclusively the information bit signal to transmit and the pilot signal generated in the pilot signal generator.

Envisioning the usage for the interference cancellation in time-varying mobile radio environments, the present invention employs coherent demodulation. The coherent reception requires the knowledge of channel characteristics i.e, channel parameters such as amplitude and phase which may be time-varying in mobile radio environments. A candidate for estimating the channel parameters is to transmit a separate pilot signal for each user, whose power is set lower than data signal power. Thus, the receiver estimates the channel amplitude and phase by using the pilot signal without prior knowledge of the channel condition. The pilot signal transmitted for coherent demodulation can increase the interference, but the pilot signal too can be canceled by the interference cancellation process.

Figure 4:
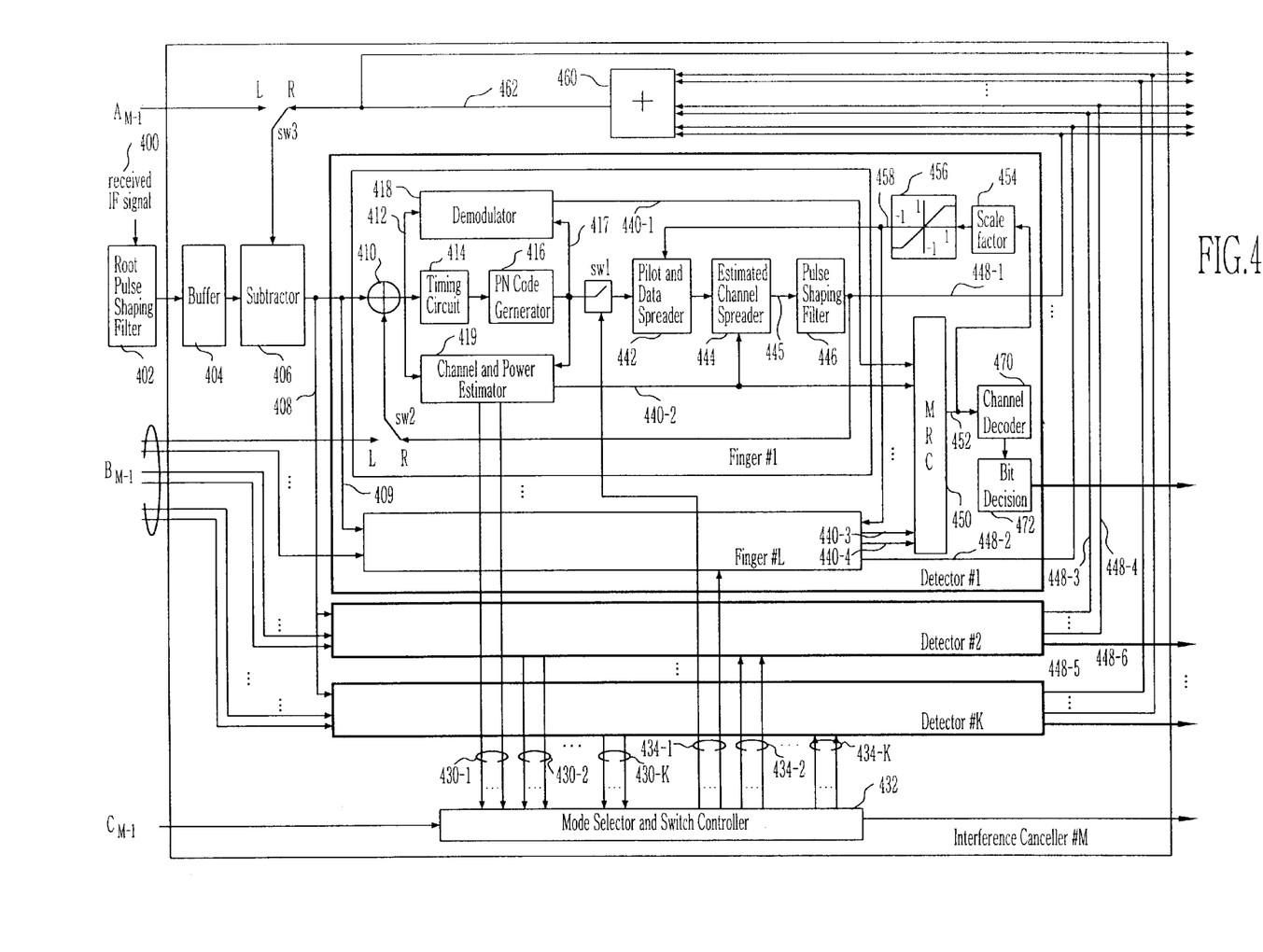
FIG. 4 is a structure diagram of a receiver of CDMA system using an interference canceling method and apparatus of a multi-mode subtraction type in asynchronous multipath channels.

FIG. 4 shows a structure of CDMA system receiver using an interference canceling method of a multi-mode subtraction type in asynchronous multipath channels, which act as below.

The received intermediate frequency (IF) signal 400 is generated through the receiver antenna and the carrier frequency demodulator and the analog-to-digital converter which are abbreviated in FIG. 4. The received IF signal 400, which is passed through the root pulse shaping filter 402 equal with the root pulse shaping filters 110-1, 110-2, 110-K which each user use in transmitting and transformed into the baseband signals, is stored in the buffer 404.

The baseband signals of the buffer 404 are inputted to each detector (Detector #1, Detector #2, . . . , Detector #K) through the path 408, and the equivalent baseband signals are inputted to each finger (Finger #1, Finger #2, . . . , Finger #L) of each detector through the path 409. Wherein the function of each finger of each detector is to detect L multipath signals of each user.

By using the inputted baseband signal, the timing circuit 414 processes the PN code acquisition and the tracking process. By using timing information outputted in the timing circuit 414, the PN code generator 416 generates the PN code 417 equal with the PN code used in the transmitted signal.

By using the generated the PN code 417 and the walsh code, the demodulator 418 demodulate the baseband signal 412, and the channel and power estimator 419 estimate the amplitude and phase and the power value of the channel parameters.

By using the estimated power values 430-1, 430-2, 430-K outputted in the channel and power estimator 419 within each finger (Finger #1, . . . , Finger #L) of each detector (Detector #1, Detector #2, . . . , Detector #K), the mode selector and switch controller 432 decide the ranking of the power values, and select the proper IC mode among the various IC modes supported by the present invention according to the total number of users in service, the hardware speed to implement the present method and the power spread of received signals, and control the switch 1 (SW1) within each finger of each detector according to the selected IC mode by the signals 434-1, 434-2, 434-K.

The finger(s) selected at the previous cancellations as well as the finger(s) having the closed switch 1 (SW1) at the current cancellation only participate in the cancellation. As the number of cancellations increases, the number of fingers having been selected up to the current cancellation increases.

The maximal ratio combiner 450 makes the signal 440-1, 440-2, 440-3, 440-4 outputted in L fingers to the signal combined in a maximal ratio combining method, for combining without omitting the power of L multipath signals of each user.

The function of the maximal ratio combiner 450 is to combine respectively the results of multiplying the signal-to-noise ratio of L multipath signals to L multipath signals.

To make the tentative bit decision most approximately to the bit produced by the asynchronous multipath fading channels, the scale factor 454 multiplies the scale value to the combined signal 452 and the clipper 456 does the clipper's processing. Wherein, the scale value multiplied by the scale factor 454 is adjusted according to the channel environment and the selected IC mode. The clipper 456 let the output equal the input in case that the input is between −1 and 1, but the output has a constant of 1 in case that the input is more than 1 and the output has a constant of −1 in case that the input is less than −1.

The estimate of the transmitted bit data is obtained tentatively by using the output of the maximal ratio combiner 450 rather than the output of the channel decoder 470. The channel decoding introduces the delay, so that bit decision for regeneration after channel decoding may result in performance degradation in fast time-varying channels and requires long buffer size. However, final bit decision is obviously made after channel decoding.

The pilot and data spreader 442 of the finger having the closed switch 1 (SW1) respread the output signal 458 of the clipper 456 with the generated PN code 417 and walsh code equal with the method in the transmitting signal of FIG. 1. The estimated channel processor 444 regenerates the baseband signal 445 by multiplying the estimated channel parameters to the output signal of the pilot and data spreader 442.

The regenerated the baseband signal 445 is transformed to the pulse shaped baseband signals 448-1, 448-2, 448-3, 448-4, 448-5, 448-6 in the pulse shaping filter 446. The pulse shaping filter 446 has the same effects with the device that the root pulse shaping filters 110-1, 110-2, 110-K of FIG. 1 and the root pulse shaping filter 402 are accessed serially.

The pulse shaped baseband signals 448-1, 448-2, 448-3, 448-4, 448-5, 448-6 are transformed to the added signal 462 in the adder 460. The subtractor 406 subtracts the added signal 462 from the baseband signal stored in the buffer 404.

One or several of multipath signals with the large power in the power sequence are canceled from the received signal by the above procedures.

The subtractor 406 generates the interference-subtracted resultant signal 408 by subtracting the selected and regenerated path signals from the received signal and then the adder 410 adds the pulse shaped baseband signals 448-1, 448-2, 448-3, 448-4, 448-5, 448-6 of the finger having the closed switch 1 (SW1) to the interference-subtracted resultant 408 through the feedback path (when SW2 is in the R position), and thus the adder 410 generates the corresponding path's original input signal of the next operation.

By adding the regenerated signal of corresponding path to the interference-subtracted resultant, each finger of each user having the closed switch 1 (SW1) too keeps participating in the subsequent cancellation processing with new (more cleaned) input signal (which is composed of the corresponding path's original received signal and a signal obtained by canceling the MAI of the selected other paths). It shows that all of the fingers in the present invention can repeat estimating, regenerating, and canceling out the MAI recursively at every cancellations with a single stage. The term of "enhanced" in the present invention stands for this advantage.

The channel decoder 470 and the bit decider 472 decide finally the transmitted bit information by using the signal 452 which is obtained by the completion of interference canceling process.

Figure 2:
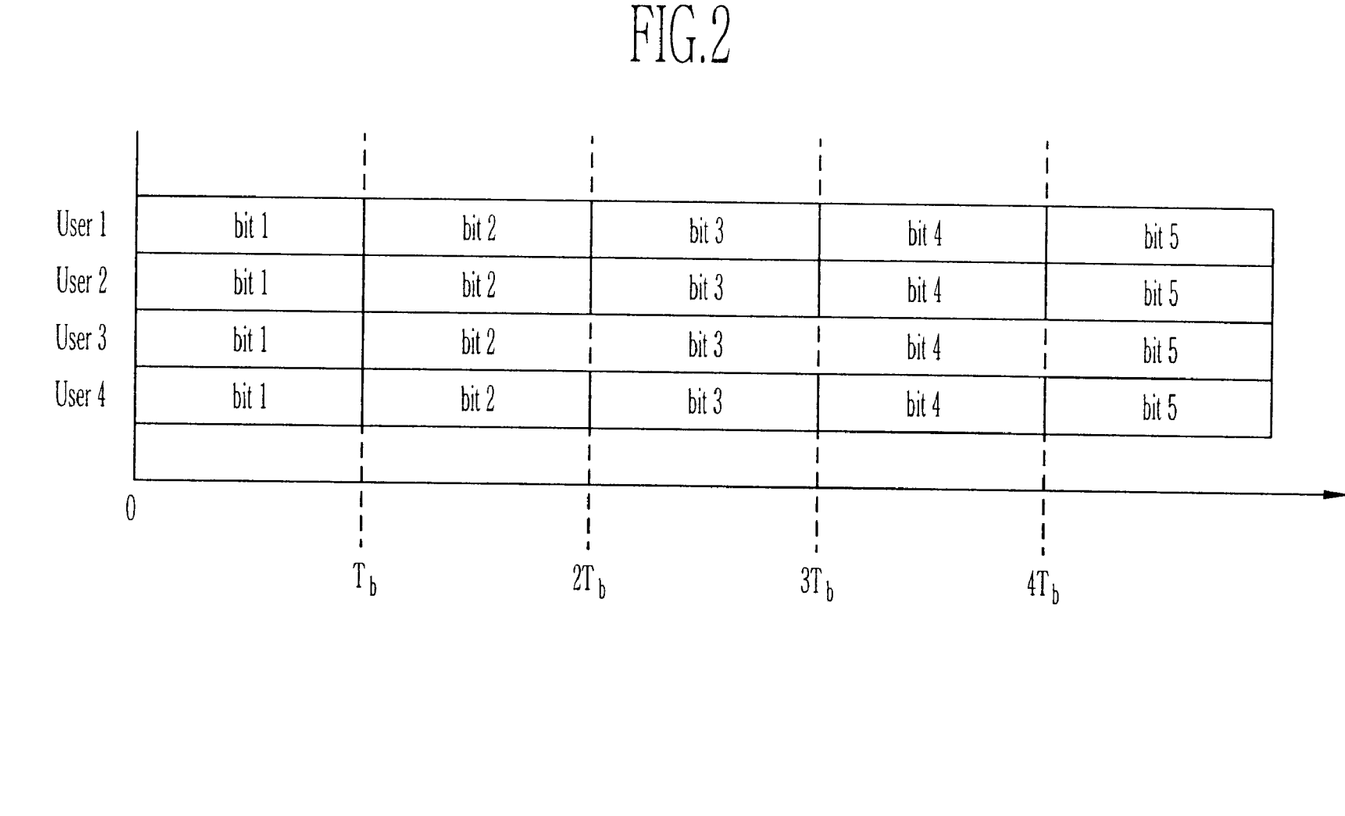
FIG. 2 is a structure diagram of each user's bits in a synchronous channel.

It is shown in FIG. 2 that the bits of each user are aligned over time in the synchronous channel. The bit detection and cancellation for the specific bit in the synchronous channel can focus on one bit interval without considering the other bits. Namely, the bit detection and cancellation for the bit 1 of user 1 is done by considering the bit 1 of user 2 and the bit 1 of user 3 and the bit 1 of user 4 only. The bit detection and cancellation in the synchronous channel can be accomplished in terms of one bit. But the channel has the asynchronous property in the real situation.

Figure 3:
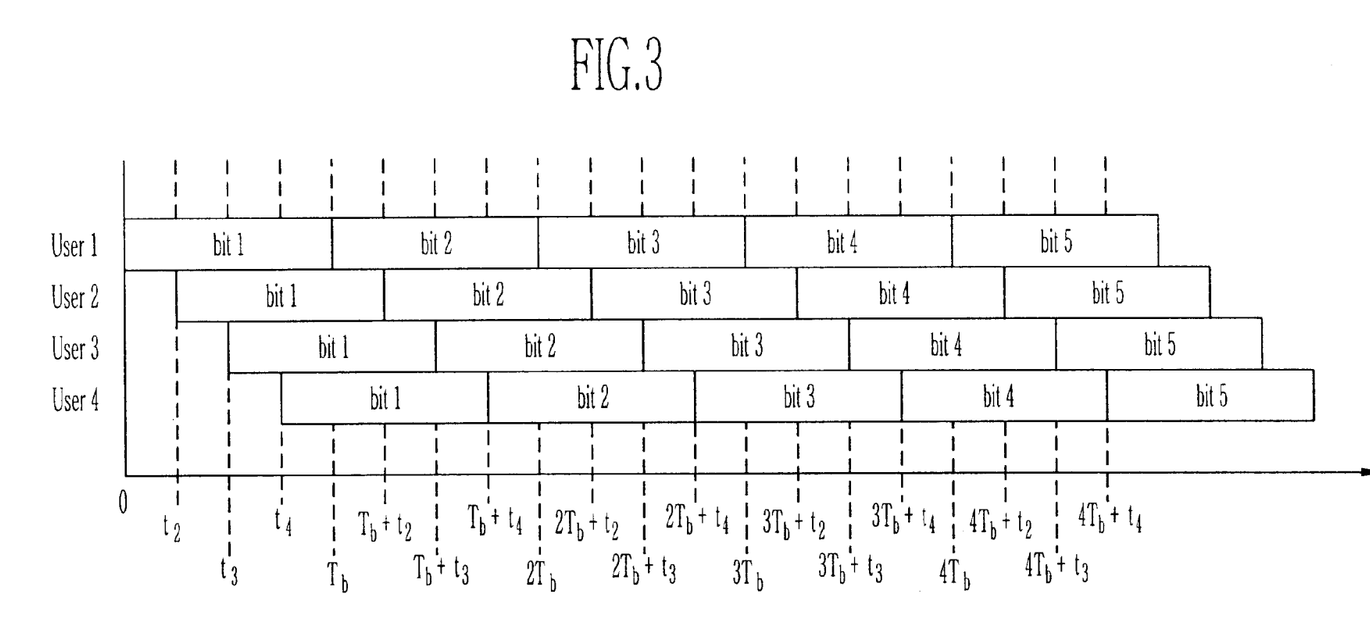
FIG. 3 is a structure diagram of each user's bits in an asynchronous channel.

It is shown in FIG. 3 that the bits of each user are not aligned over time in the asynchronous channel. In this case, the overlapped bits of each user must be considered for the bit detection and cancellation for the specific bit. Due to this reason, the bit detection and cancellation in the asynchronous channel is made after receiving a group of n (n is over 2) bits of each user.

In asynchronous channel, the bit decision and cancellation method used at the SIC method is as follows. After group n bits of each user are received and stored, the correlations of the n bits of each user are averaged and the ranking of the users is obtained from these averages of correlations over n bits. This method which cancels group n bits of each user according to the ranking of the users can be termed by block processing method. We now describe two problems in the block processing method. The first problem is that since the ranking of the users is obtained from these averages of correlations over n bits, as the number of n bits increases, the accuracy of the ranking decreases. The second problem is that since group n bits of each user are canceled, as the number of n bits decreases and the number of users increases, the duration of imperfect cancellation increases and the performance of cancellation decreases.

These problems are explained at FIG. 3. We assume that the rank of the user power is the sequence of the user 1~4 and n is two bits. First of all, the bit 1 and bit 2 of the user 1 are regenerated and canceled in the received signal, then the bit 1 and bit 2 of the user 2 are regenerated and canceled. But since the bit 2 of the user 2 overlaps with the bit 3 of the user 1 at interval from 2Tb to 2Tb+t2, at which the user 2 can not have the effect of the cancellation, although the bit 1 and bit 2 of the user 1 is already canceled. It result from the fact that the bits of each user are not aligned over time in the asynchronous channel. This situation happens even worse to the user 4. Since the bit 2 of the user 4 overlaps with the bit 3 of the user 1 at intervals from 2Tb to 2Tb+t4 and the bit 3 of the user 2 at intervals from 2Tb+t2 to 2Tb+t4 and the bit 3 of the user 3 at intervals from 2Tb+t3 to 2Tb+t4, the user 4 can not have the effect of the cancellation at these intervals.

These problems can be solved as below by the present invention.

In the case of doing the bit decision and cancellation in terms of two bits in FIG. 3, the interference canceling is processed for the three bits (bit 1, bit 2, bit 3) and the two bits only is decided. The last bit (bit 3) is regenerated after being removed and the three bits (bit 3, bit 4, bit 5) are processed in the next interference canceling process. This method which processes overlappingly the last bit of the multiple bits can be termed by duplication processing method. The duplication processing method has the advantage of increasing the efficiency of the interference canceling process by preventing the incomplete interference canceling in terms of the multiple bits only in the asynchronous channel. By using the duplication processing method, the other delayed users can have the entire benefit from cancellation of the leading users.

The signals transmitted by each user of FIG. 1 are inputted to the receiver of FIG. 4 through the several paths of the different characters respectively instead of the single path due to the reflection and so forth done by the topography and the ground. In most realistic applications, the reverse links, for which the subtractive IC methods are implemented, are chip-asynchronous and usually have several paths. Each detector (Detector #1, Detector #2, . . . , Detector #K) of FIG. 4 processes the signal of each user and each finger (Finger #1, . . . , Finger #L) within each detector processes the received a signal through the multipath of the different properties respectively of each user.

For efficient operation in multipath channels with unequal powers, at each cancellation one finger or a group of fingers with maximum power except for the fingers selected at previous cancellation is selected. That is, a group of fingers from different user detectors can be selected while a user detector composed of a group of fingers is selected in the SIC method. In practice, the relative power of minor paths to a dominant path is very weak; thus the SIC method selecting a user detector shows performance degradation since the finger(s) for weak path(s) is (are) involved in cancellation with poor estimates. In the present invention, the finger with the minor path will be selected later than the finger with the dominant path by the mode selector and switch controller 432.

The present invention supports the multi-mode IC method. The mode selector and switch controller 432 of FIG. 4 can select the proper IC method by considering the total number of users in service and the hardware speed to implement the present method and the power spread of received signals. The IC method that can be selected is as follow.

First, Enhanced Serial Interference Cancellation (ESIC) method;

The IC method that cancel the interference in case that the mode selector and switch controller 432 selects the signal to reduce one by one, in environments that the total number of users in service is a large number and the hardware speed is high and the power spread of received signals is wide.

Second, Group-wise ESIC (GESIC) method;

The IC method that cancel the interference in case that the mode selector and switch controller 432 selects the signal to reduce by above two and below the number of the total paths, in environments that the total number of users in service is a large number and the hardware speed is middle and the power spread of received signals is wide.

Third, Recursive Parallel Interference Cancellation (RPIC) method;

The IC method that cancel the interference in case that the mode selector and switch controller 432 selects the signal to reduce by the number of the total paths, in environments that the total number of users in service is a small number and the hardware speed is low and the power spread of received signals is narrow.

Fourth, GESIC-to-RPIC (GESRPIC) method;

The IC method that cancel the interference in case that the mode selector and switch controller 432 selects the GESIC method in the initial interference canceling process and the RPIC method in the last interference canceling process, in environments that the total number of users in service is a large number and the hardware speed is low and the power spread of received signals is wide.

Figure 5:
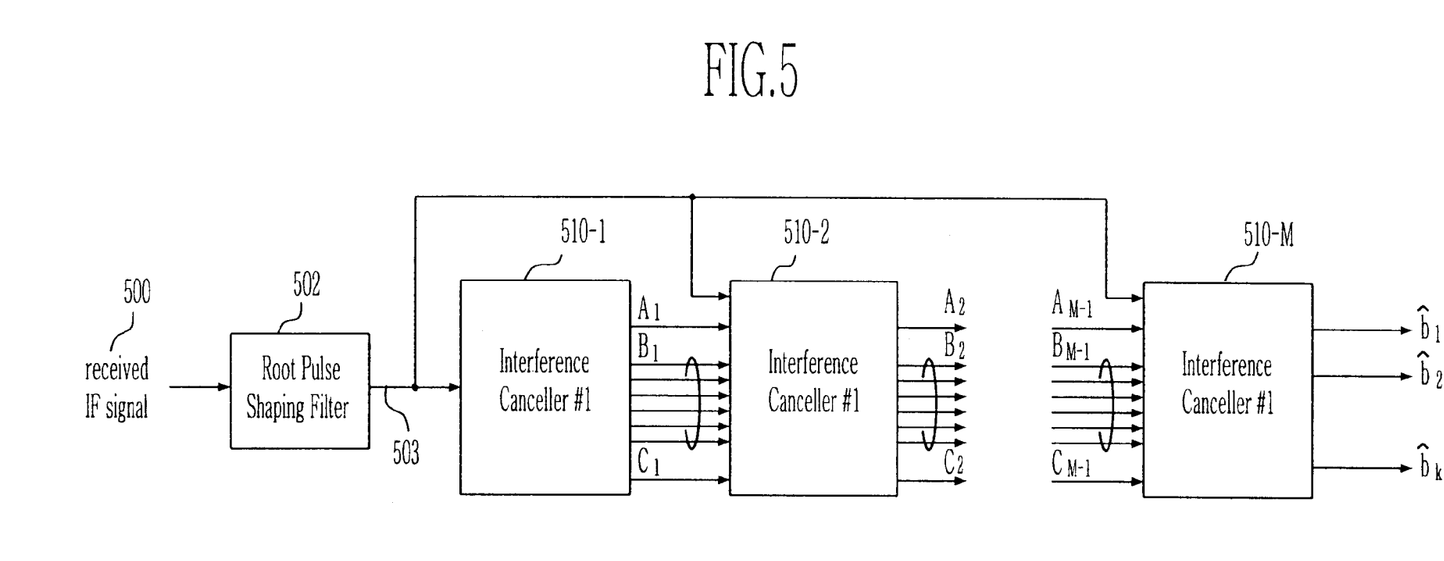
FIG. 5 is a structure diagram of an interference canceling apparatus of a multistages multi-mode subtraction type in asynchronous multipath channels.

When the processing speed is not fast enough to give required performance with a single stage, the present invention can be implemented with a variable number of stages, as shown in FIG. 5. Since the present invention can work the proper IC operations recursively with a single stage as explained before, the number of stages to get required performance can be decreased. In addition, the present invention reduces the number of adders and connections for subtraction approximately to 1/K of that required for the PIC method (K is the number of detectors in service), since interference-subtracted resultant is commonly used for all users' input signals.

The interference canceller of the multi-stages multi-mode subtraction type of FIG. 5 is composed by cascading a variable number of the apparatus equal with the interference canceller (Interference Canceller #M) of the multi-mode subtraction type of FIG. 4. The CDMA system receiver using the interference canceling apparatus of the multi-stages multi-mode subtraction type of FIG. 5 acts as below.

The received IF signal 500 equal with the received IF signal 400 of FIG. 4 is transformed to the baseband signal 503 through the root pulse shaping filter 502 equal with the root pulse shaping filter 402 of FIG. 4. The baseband signal 503 is stored in the internal buffer of the interference canceller 510-1, 510-2, 510-M of each stage.

After the 1th stage interference canceller (Interference Canceller #1) 510-1 completes the interference canceling process during an allowed time, the 2th stage interference canceller (Interference Canceller #2) 510-2 cancels the interference during an allowed time by using the signal outputted in the 1th stage interference canceller 510-1. As the processes are continued, after the (M-1)th stage interference canceller (Interference Canceller #M-1) completes the interference canceling process during an allowed time, the Mth stage interference canceller (Interference Canceller #M) 510-M cancels the interference during an allowed time by using the signal outputted in the M-1)th stage interference canceller, and decides the transmitted bit information.

In case that the interference canceller of the multi-stages multi-mode subtraction type is composed, the signal AM-1 (obtained by summing the pulse shaped baseband signals 448-1, 448-2, 448-3, 448-4, 448-5, 448-6 in the adder 460)

and the signals BM-1 (the pulse shaped baseband signals 448-1, 448-2, 448-3, 448-4, 448-5, 448-6) and the signal CM-1 (the output signal of the mode selector and switch controller 432) which are outputted in the Interference Canceller #M-1, are coupled to the Interference Canceller #M. The Interference Canceller #M inputs the AM-1 and BM-1 signals by controlling the positions of the switch 2 (SW2) and the switch 3 (SW3) to L respectively. When the baseband signal 412 is effective, the Interference Canceller #M starts the interference cancellation of the Mth state by controlling the positions of the switch 2 (SW2) and the switch 3 (SW3) to R respectively.

The performance comparisons of IC methods via computer simulation are carried out over asynchronous multipath Rayleigh fading channels. We consider a time asynchronous/phase-asynchronous CDMA system, where the time delays are uniformly distributed between 0 and bit time Th, and the phases are uniformly distributed between 0 and $2\pi$. We set the carrier frequency to 2 GHz and the chip rate to 4.096 Mchips/sec. It is assumed that the path signal undergoes a Rayleigh fading channel with mobile velocity of 50 Km/h. The long PN sequence has period equal to $2^{42}$ −1 like IS-95. The processing gain is of 16. We employ as a base example a pilot channel-aided coherent BPSK modulation with imperfect estimation. The estimates of the channel parameters are obtained by using the 1280 chips' interval of the pilot signal whose power is set to 6 dB below that of the traffic (the information bit) signal.

Figure 6:
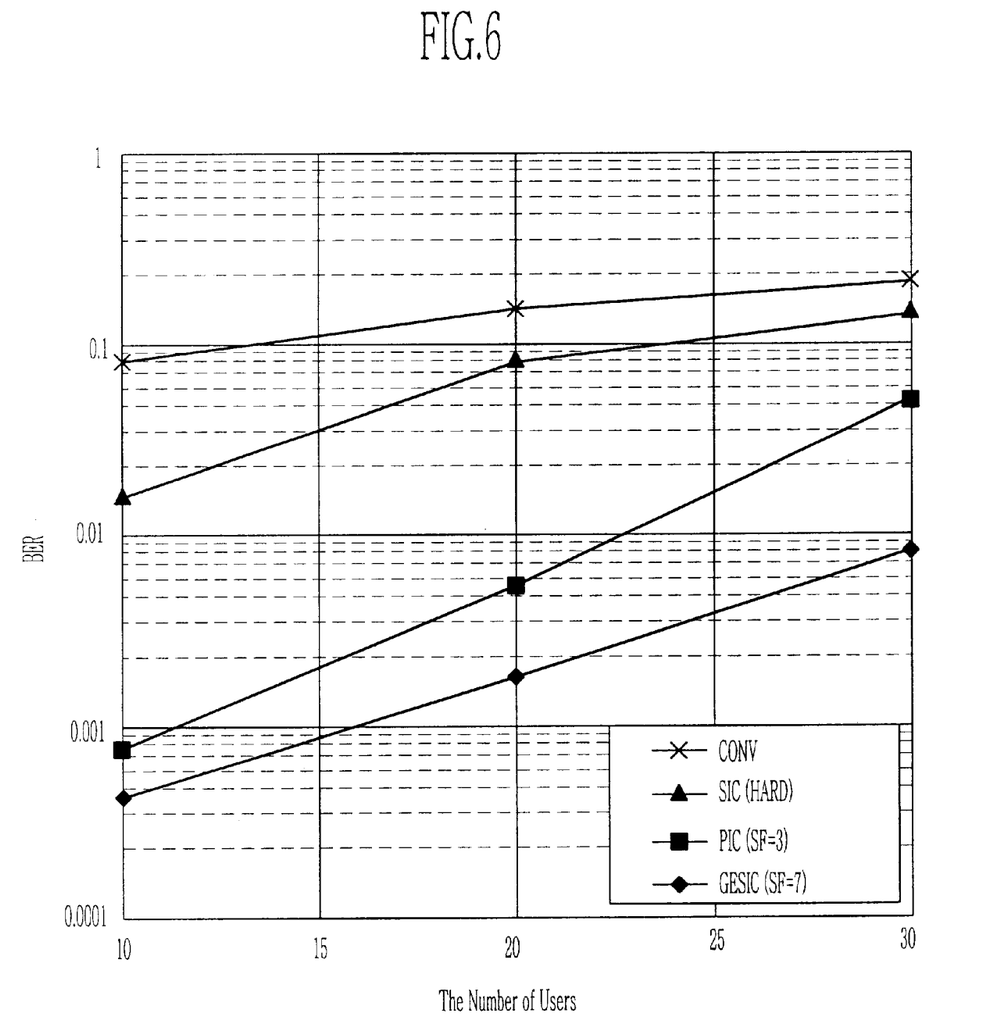
FIG. 6 shows BER performance as a function of the number of users for the IC methods in asynchronous one-path Rayleigh fading channel.

FIG. 6 shows BER performance as a function of the number of users for the IC methods in asynchronous one-path Rayleigh fading channel. The number of cancellations is limited to 5. Here, hard decision (HARD) is used at the SIC method and the scale value multiplied by the scale factor (SF) is 3 at the PIC method and 7 at the GESIC method. The SIC method cannot have prominent performance improvement over the other IC methods since the number of cancellation is limited and thus the interference due to the uncanceled users is dominating. The GESIC method (the number of the selected detectors is K/5 at each cancellation, K is the number of detectors in service) solves this limitation and has better performance than the conventional single user detection (CONV) method and the other IC methods since it reduces the effects caused by the spread of received signals' power using the group-wise ESIC operation.

Figure 7:
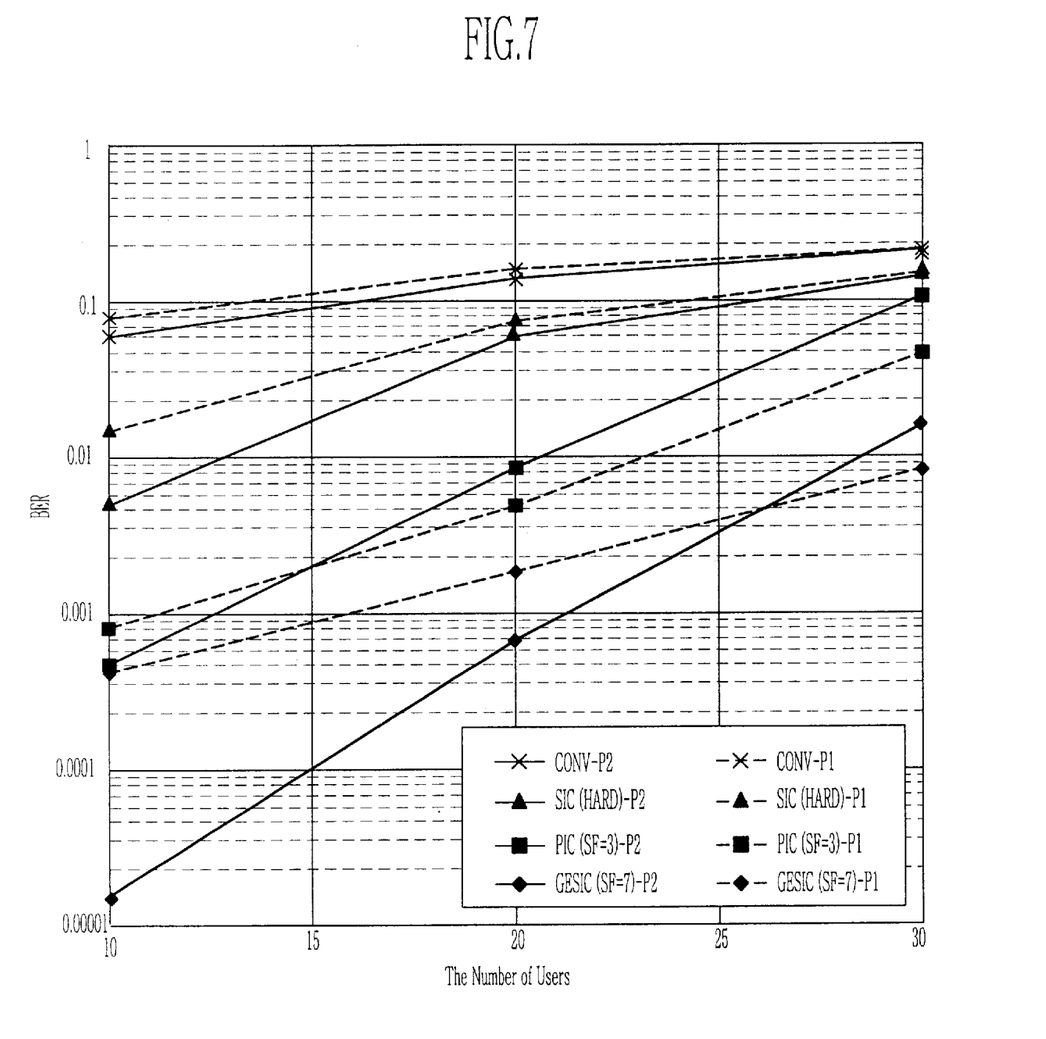
FIG. 7 shows BER performance as a function of the number of users for the IC methods in asynchronous two-path Rayleigh fading channel.

FIG. 7 shows BER performance as a function of the number of users for the IC methods in asynchronous two-path Rayleigh fading channel. For comparing with the performance of two-path (P2), the performance of one-path (P1) at FIG. 6 is added. The number of the cancellations is limited to 5. As the number of paths increases, the BER performance of the IC methods can be increased in the range of the small number of users due to maximal ratio combining. But in the range of the large number of users the BER performance of the IC methods can not be increased, since the effect of multipath is like the adding of interfering users. Especially, as the number of paths increases, the PIC method cannot have prominent performance improvement over the other IC method, since the fingers for the weak paths participate in the cancellation with the corrupted estimates including channel parameters and bit decision. Based on the computer simulation results, we observe that the GESIC method (one of the multi-mode IC method supported by the present invention) has not only substantial capacity improvement compared to the CONV method and the SIC method, but also outperforms the PIC method.

The foregoing description, although described in its preferred embodiment with a certain degree of particularity, is only illustrative of the principles of the present invention. It is to be understood that the present invention is not to be limited to the preferred embodiments disclosed and illustrated herein. Accordingly, all expedient variations that may be made within the scope and spirit of the present invention are to be encompassed as further embodiments of the present invention.

What is claimed:

1. An interference canceling method of a multi-mode subtraction type in an asynchronous multipath channels of code division multiple access (CDMA) system, including the steps of:

storing a received intermediate frequency (IF) signal, which passed through a root pulse shaping filter and transformed into a baseband signals, to a buffer;

inputting the signal outputted in the buffer to each finger of each detector;

processing a pseudo-random noise (PN) code acquisition and tracking process in a timing circuit by using the inputted baseband signal;

generating a PN code equivalent with a PN code used in the transmitted signal in a PN code generator by using timing information outputted in the timing circuit;

demodulating the baseband signal in a demodulator by using the generated PN code and a walsh code;

estimating an amplitude and a phase and a power value of channel parameters in channel and power estimator;

deciding a ranking of the power values, and selecting a proper IC mode among various IC modes according to a total number of users in service, a hardware speed and a power spread of received signals, and closing a switch 1 (SW1) within each finger of each detector according to a selected IC mode, in a mode selector and a switch controller;

combining a signal outputted in L fingers in a maximal ratio combining method, for combining without omitting the power of L multipath signals of each user in a maximal ratio combiner;

multiplying a scale value to the combined signal for making a tentative bit decision most approximately to a bit passed through asynchronous multipath fading channels in a scale factor, and doing processing in a clipper;

respreading an output signal of the clipper by using a generated PN code and walsh code in a pilot and data spreader of the finger having the closed switch 1 (SW1), and regenerating the baseband signal by multiplying the estimated channel parameters to the output signal of the pilot and data spreader in a estimated channel processor, transforming the regenerated baseband signal into a pulse shaped baseband signal in a pulse shaping filter;

adding the pulse shaped baseband signals in an adder;

subtracting the added signal from the baseband signal stored in a buffer, and generating an interference-subtracted resultant signal in a subtractor;

adding the pulse shaped baseband signals of the finger having the closed switch 1 (SW1) to the interference-subtracted resultant through a feedback path, and generating a clean input signal in an adder;

carrying on recursively the interference canceling process on a basis of the clean input signal with a single stage; and deciding the transmitted bit information in a channel decoder and a bit decider by using a signal obtained by a completion of the interference canceling method.

2. The interference canceling method of the multi-mode subtraction type in asynchronous multipath channels of CDMA system as set forth in claim 1, wherein said bit decision and cancellation in said asynchronous channel is processed by processing overlappingly a last bit of said multiple bits.

3. The interference canceling method of a multi-mode subtraction type in asynchronous multipath channels of CDMA system as set forth in claim 1, wherein said interference cancellation in said multipath channels is processed according to a power sequence of each multipath signal of each user.

4. The interference canceling method of a multi-mode subtraction type in asynchronous multipath channels of CDMA system as set forth in claim 1, wherein said maximal ratio combiner combines the signal outputted in L fingers in said maximal ratio combining method, to combine without omitting the power of L multipath signals of each user.

5. the interference canceling method of the multi-mode subtraction type in asynchronous multipath channels of CDMA system as set forth in claim 1, wherein said scale factor multiplies the scale value to said combined signal and said clipper processing to make a tentative bit decision most approximately to the bit passed through said asynchronous multipath fading channels.

6. The interference canceling method of the multi-mode subtraction type in asynchronous multipath channels of CDMA system as set forth in claim 1, wherein said mode selector and switch controller select a proper interference canceling method among Enhanced Serial Interference Cancellation (ESIC) method and Groupwise ESIC (GESIC) method and Recursive Parallel Interference Cancellation (RPIC) method and GESIC-to-RPIC (GESRPIC) method according to a total number of users in service, the hardware speed and the power spread of received signals.

7. The interference canceling method of a multi-mode subtraction type in asynchronous multipath channels of CDMA system as set forth in claim 1, wherein by operation of said mode selector and switch controller, the finger(s) selected at the previous cancellations as well as the finger(s) having the closed switch 1 (SW1) at the current cancellation only participate in the cancellation, and as the number of cancellations increases, the number of fingers having been selected up to the current cancellation increases.

8. The interference canceling method of the multi-mode subtraction type in asynchronous multipath channels of CDMA system as set forth in claim 1, wherein an interference canceller of a multi-mode subtraction type processes recursively the interference canceling with a single stage only and reduces a number of adders and connections for subtraction approximately to 1/K of that required for a PIC method.

9. The interference canceling method of a multi-mode subtraction type in asynchronous multipath channels of CDMA system as set forth in claim 1, wherein said interference canceller of the multi-mode subtraction type can be implemented with a variable number of stages, and said interference canceller of the multi-mode subtraction type reduces the number of stages compared with the PIC method in case that the interference canceling apparatus is made up multi-stages since said interference canceller of the multi-mode subtraction type works the proper IC operations recursively with a single stage.

10. An interference canceling apparatus of a multi-mode subtraction type in asynchronous multipath channels of code division multiple access (CDMA) system, comprising:

a root pulse shaping filter that transforms a received intermediate frequency signal into a baseband signal;

a buffer for storing the baseband signal transformed through the root pulse shaping filter;

a timing circuit of each finger that processes a PN code acquisition and tracking process with the baseband signal outputted in the buffer as a input signal;

a PN code generator that generates a PN code equivalent with a PN code used in the transmitted signal by using timing information outputted in the timing circuit;

a demodulator that demodulates the baseband signal by using the generated PN code and a walsh code;

a channel and power estimator that estimates an amplitude and a phase and a power value of channel parameters;

a mode selector and switch controller that decides a ranking of the power values, and selects a proper interference canceling mode among a various interference canceling modes according to a number of users and a channel environment and hardware speed, and closes a switch 1 (SW1) within each finger of each detector according to a selected interference canceling mode;

a maximal ratio combiner that combines a signal outputted in L fingers in a maximal ratio combining method, for combining without omitting a power of L multipath signals of each user;

a scale factor that multiplies a scale value to a combined signal for making a tentative bit decision most approximately to a bit passed through the asynchronous multipath channels;

a clipper for clipper processing;

a pilot and data spreader that respreads an output signal of the clipper by using the generated PN code and walsh code at the finger having the closed switch 1 (SW1);

an estimated channel processor that regenerates the baseband signal by multiplying the estimated channel parameters to the output signal of the pilot and data spreader;

a pulse shaping filter that transforms the regenerated baseband signal into a pulse shaped baseband signal;

an adder that adds the pulse shaped baseband signal;

a subtractor that subtracts the added signal from the baseband signal stored in the buffer and generates an interference-subtracted resultant signal;

an adder of each finger that adds the pulse shaped baseband signal of the finger having the closed switch 1 (SW1) to an interference-subtracted resultant through a feedback path, and generates a clean input signal;

an interference canceler that carries on recursively an interference canceling process on a basis of the clean input signal with a single stage; and a channel decoder and a bit decider that decides the transmitted bit information by using the signal which is obtained by a completion of interference canceling process.

* * * * *